No. 874,431.

PATENTED DEC. 24, 1907.

J. H. PITKIN.
FAN.
APPLICATION FILED FEB. 3, 1906.

Witnesses:
F. W. Hoffmeister.
F. N. Daggett.

Inventor.
Julian H. Pitkin.
By J. C. Warner,
Attorney.

UNITED STATES PATENT OFFICE.

JULIAN H. PITKIN, OF CHICAGO, ILLINOIS, ASSIGNOR TO INTERNATIONAL HARVESTER COMPANY, A CORPORATION OF NEW JERSEY.

FAN.

No. 874,431.　　　Specification of Letters Patent.　　　Patented Dec. 24, 1907.

Application filed February 3, 1906. Serial No. 299,229.

*To all whom it may concern:*

Be it known that I, JULIAN H. PITKIN, a citizen of the United States, residing at Chicago, in the county of Cook and State of Illinois, have invented a new and useful Improvement in Fans, of which the following is a complete specification.

This invention relates to an attachment for fan blades, and has for its object to increase the capacity and efficiency of same.

Figure 2:
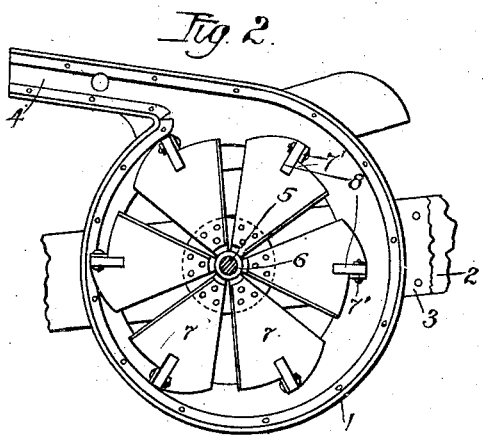
Figure 1:
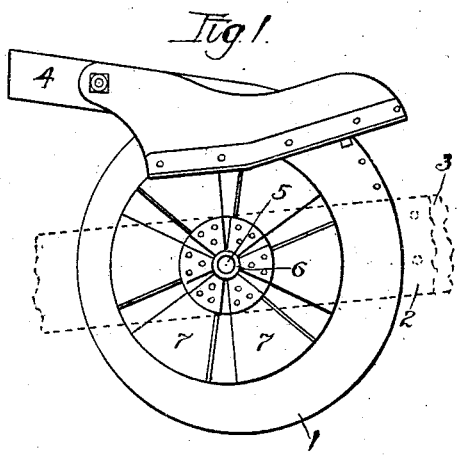
Figure 3:
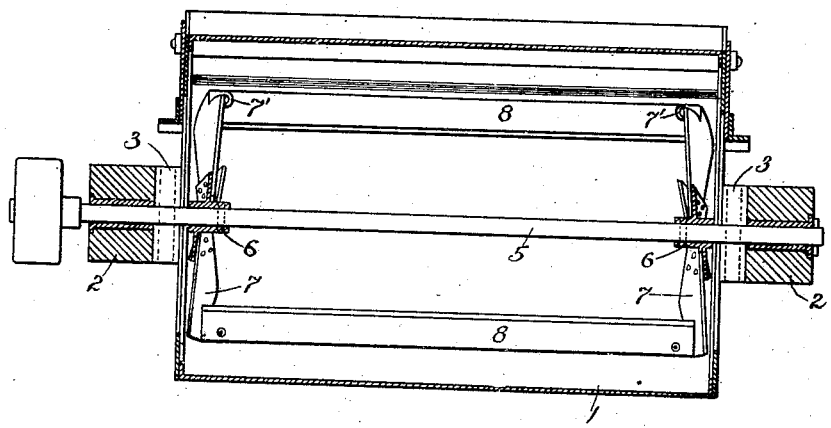
Figure 4:
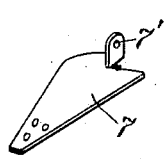

Referring to the accompanying drawings—Figure 1 represents a side elevation of a complete fan and fan casing. Fig. 2 is a transverse section through the fan and fan casing. Fig. 3 is a central longitudinal section of the device, and Fig. 4 represents a detail perspective of one of the fan blades.

The fan casing 1 is cylindrical in form and preferably of a length equal to about twice its diameter. The casing is supported upon the sills 2 of the main frame by means of the brackets 3, and at the upper side of the casing is formed the tangential outlet 4 for the blast. In the sills 2 of the main frame, and extending through the fan casing, is journaled the shaft 5, the said shaft being eccentrically located with respect to the fan casing. On the shaft 5 are secured the hubs 6, to which are secured the radially extending, spirally arranged fan blades 7, one of which is shown in detail in Fig. 4. The fan blades on the two hubs are oppositely inclined, as shown in Fig. 3, in order that a forward rotation of same will operate to draw the air into the casing from both ends.

To increase the effectiveness of the fan, auxiliary fan blades 8 are provided. These auxiliary blades extend parallel with the fan shaft and transversely with respect to the radially extending blades, the free ends of which are connected thereby. The inwardly projecting lugs 7¹ on the blades 7 afford fastening means for the ends of the auxiliary blades 8. The combination of the two forms of fan blades makes an exceedingly effective fan, so that with the same power a much greater blast can be produced than when the single form is used, as an equal blast will be produced with less power.

What I claim as my invention and desire to secure by Letters Patent is:

1. In a device of the class described, in combination, a fan casing having openings in the ends thereof, radially extending, spirally arranged fan blades mounted at each end of said casing, and auxiliary blades secured to and connecting the outer ends of said radial blades, substantially as and for the purpose specified.

2. In a device of the class described, in combination, a cylindrical fan casing provided with openings in the ends thereof, a shaft journaled in suitable bearings in said casing, radially extending, spirally arranged fan blades mounted at each end of said casing, the inclination of the blades being opposite at the opposite ends of the fan casing, and auxiliary blades secured to and connecting the outer ends of said radial blades, substantially as and for the purpose specified.

3. In a device of the class described, in combination, a cylindrical fan casing provided with openings in the ends thereof, a shaft journaled in suitable bearings in said casing and eccentrically disposed relative thereto, hubs secured to said shaft, radially extending, spirally arranged fan blades fixed to said hubs, the inclination of the blades being opposite at the opposite ends of the fan casing, and auxiliary blades secured to and connecting the outer ends of said radial blades, substantially as and for the purpose specified.

JULIAN H. PITKIN.

Witnesses:
　OSCAR A. ANDERSON,
　THOMAS B. REED.